United States Patent [19]

Yamakawa et al.

[11] Patent Number: 5,789,013
[45] Date of Patent: Aug. 4, 1998

[54] FROZEN BLANCHED GREEN AGRICULTURAL PRODUCT

[75] Inventors: Tomohiko Yamakawa, Tokyo; Toshiro Kurihara, Kanagawa, both of Japan

[73] Assignee: Nippon Suisan Kaisha, Ltd., Tokyo, Japan

[21] Appl. No.: 719,001

[22] Filed: Sep. 24, 1996

Related U.S. Application Data

[62] Division of Ser. No. 246,701, May 20, 1994.

[30] Foreign Application Priority Data

May 20, 1993 [JP] Japan ................................. 5-154105
Jun. 21, 1993 [JP] Japan ................................. 5-191570

[51] Int. Cl.$^6$ ............................................. A23L 1/20
[52] U.S. Cl. ........................ 426/634; 426/507; 426/508
[58] Field of Search ............................. 426/634, 507, 426/508

[56] References Cited

U.S. PATENT DOCUMENTS

| | | | |
|---|---|---|---|
| 2,186,003 | 1/1940 | Blaiv | 426/615 |
| 3,635,728 | 1/1972 | Rockland . | |
| 4,102,048 | 7/1978 | Koch | 260/316 |
| 4,521,439 | 6/1985 | Bentsson et al. | 426/615 |

FOREIGN PATENT DOCUMENTS

| | | |
|---|---|---|
| 0339112 | 9/1985 | European Pat. Off. . |
| 0155703 | 11/1989 | European Pat. Off. . |
| 83104533 | 11/1995 | Taiwan . |

OTHER PUBLICATIONS

Database Abstract. FSTA AN: 70(07): J0752. for Soybean Digest (1969) 30(2) 20–21 (Collins et al).
Database Abstract. FSTA AN: 91(07): J0064. for Journal of Food Science (1991) 56(2) 448–451 (Shev et al).

*Primary Examiner*—Anthony J. Weier
*Attorney, Agent, or Firm*—Sughrue, Mion, Zinn, Macpeak & Seas, PLLC

[57] ABSTRACT

A method of producing a frozen green agricultural product includes the step of blanching the green agricultural product. The blanching step includes changing the color of the green agricultural product bright, and swelling the green agricultural product to produce a frozen green agricultural product. Furthermore, an apparatus for producing a frozen green agricultural product has a cylinder including a coloring zone and a swelling zone, a steam inlet for supplying steam into the cylinder, and transporting mechanism for transporting the green agricultural product within the cylinder.

14 Claims, 1 Drawing Sheet

5,789,013

FROZEN BLANCHED GREEN AGRICULTURAL PRODUCT

This is a Continuation of application Ser. No. 08/246,701 filed May 20, 1994.

BACKGROUND OF THE INVENTION

This invention relates to a method of producing a frozen blanched green agricultural product and an apparatus therefor.

In order to commercially distribute green agricultural products (for example, kidney beans in pods, soybeans in pods, sweet pease, broad beans), green agricultural products of good qualities are blanched either in steam or in water in order to inactivate enzymes, then frozen and forwarded to the market.

Many have attempted to develop a method of producing a frozen green agricultural product which uses a blanching step, to prevent softness, freshness and taste from deteriorating until actually eating these products. However, no technique has been established hitherto for maintaining the taste of a product in season throughout the frozen-storage period.

In the case of broad beans, for example, processing conditions should be delicately changed depending on the extent of the maturity, variety freshness of the beans and the processing scale, which makes it difficult to produce uniform and tasty products.

Furthermore, a troublesome cooking operation, i.e. heating or further blanching is required before taking these products which are produced in conventional method.

The present invention has been accomplished under these circumstances, and it is an object of the present invention to provide a method of producing a frozen food which maintains the softness, freshness and taste of a green agricultural product and an apparatus therefor.

More particularly, it is an object of the present invention to provide a method of producing a frozen green agricultural product whereby a green agricultural product can be blanched without deteriorating its softness, freshness or taste and then the blanched product is frozen as such to produce a frozen food maintaining its softness, freshness and taste which can be eaten as such without heating or further blanching after thawing.

It is another object of the present invention to provide a package for maintaining the bright green color of agricultural products.

It is another object of the present invention to provide an apparatus for blanching a green agricultural product whereby a green agricultural product can be blanched at a high efficiency to thereby give a tasty product in a bright green color.

More particularly, another object of the present invention is to provide an apparatus for blanching a green agricultural product whereby the time and temperature for a hydrothermal treatment and steam-cooking can be controlled to establish the optimum treating conditions which should be changed depending on the type, extent of maturity and freshness of the green agricultural product.

SUMMARY OF THE INVENTION

The green agricultural products to be processed in accordance with the present invention include beans such as green peas in pods, kidney beans in pods, soybeans in pods, broad beans, green peas and solid vegetables in a green color such as green asparagus. Now, the present invention will be illustrated regarding soybeans in pods by way of example. The degree of blanching soybeans in pods is determined depending on the sum of the blanching temperature and time. As the blanching is effected at a higher temperature for a longer period of time, the soybeans in pods become yellowish and the hue is deteriorated. Even though the blanching temperature is low, the hue is deteriorated with a prolonged blanching time. Therefore, it is necessary to minimize the blanching time while taking the hardness and texture of the beans into consideration.

To achieve the above mentioned and other objects, the present invention provides a method of producing a frozen green agricultural product including a step of blanching the green agricultural product. The blanching step includes steps of changing the color and brightness and swelling the green agricultural product, the swelling step is to swell and soften the product. The present invention thus provides a frozen food of a green agricultural product produced by the above mentioned method, wherein a combination of a coloring step of treating a green agricultural product in hot water within a short period of time and a swelling step of steam-cooking (at 95°–100° C.) is employed. These steps make it possible to produce a blanched green agricultural product having a soft texture without deteriorating the freshness or taste thereof. The processed product thus obtained can be frozen as is and thus the softness, freshness and taste can be maintained. After thawing, it can be eaten as is without heating.

To achieve another object, the present invention provides a package of a frozen blanched soybean in pod packaged by a colored transparent package material wherein the color is green, blue or red.

To achieve another object, an apparatus for blanching a green agricultural product comprising a cylinder including a coloring zone and a swelling zone, a steam inlet for supplying steam into the cylinder, and a transporting mechanism for transporting a green agricultural product within the cylinder.

DETAILED DESCRIPTION OF THE PREFERRED EMBODIMENTS

Figure 1:
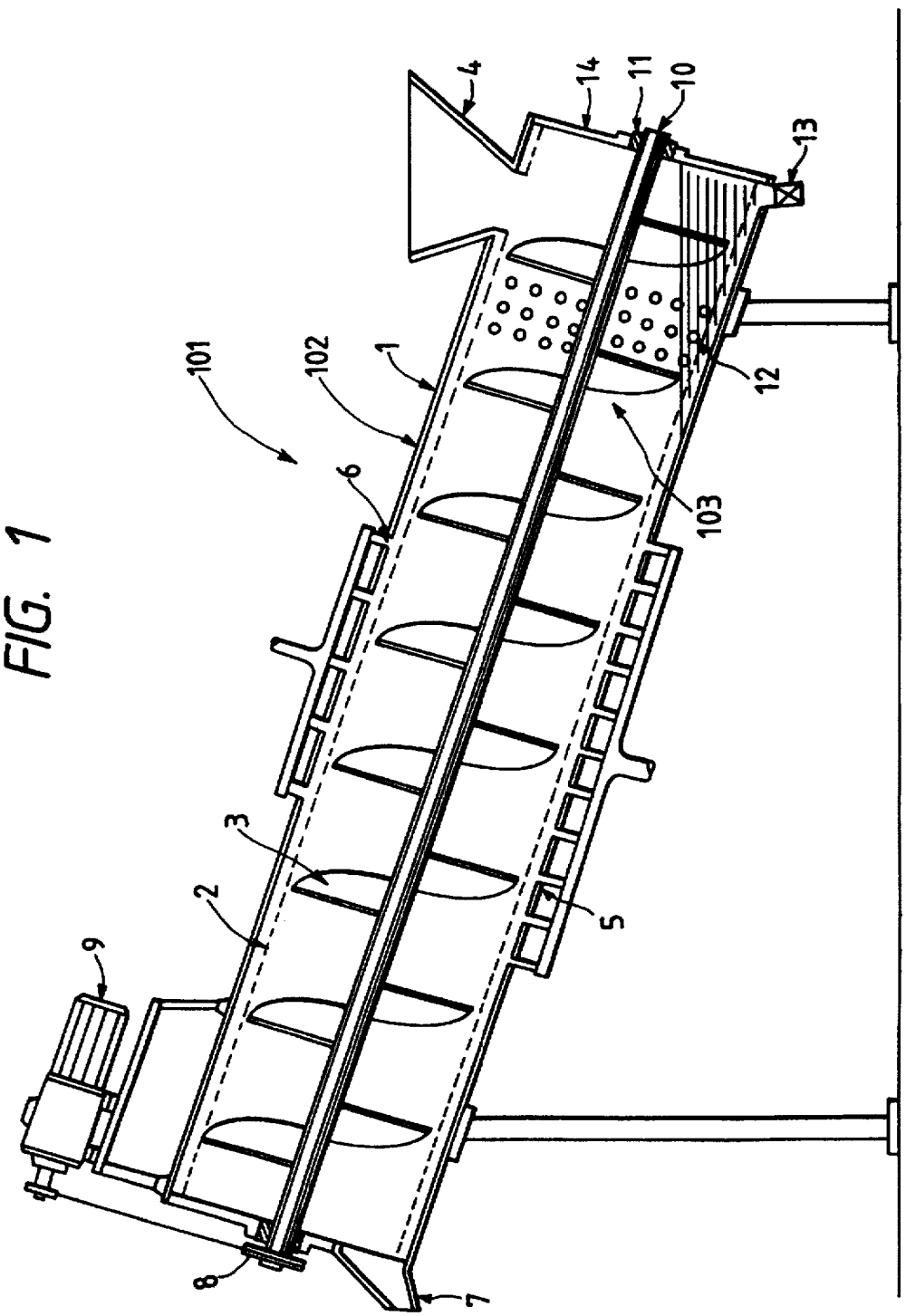
FIG. 1 shows an apparatus according to the present invention for producing a green agricultural product.

Now the present invention will be described in greater detail by reference to the following Examples. However, it is to be understood that the present invention is not restricted thereto.

EXAMPLE 1

Kidney beans in pods are fed into a cylinder and immersed in hot water which is obtained by condensing steam at 90° to 95° C. for a period of time shorter than 1 minute. Next, the kidney beans in pods are transported toward the top of the cylinder and cooked in a steam atmosphere at 95° to 100° C. for 2 to 3 minutes. Then they are taken out from the apparatus via an outlet. Thus the kidney beans in pods have been well cooked and have a bright green color and a soft texture.

EXAMPLE 2

After harvesting and collecting, soybeans in pods are subjected to a first screening. Then, they are repeatedly washed with water and subjected to a second screening. After infiltrating in brine of 15° in Baume for about 3 hours, the soybeans in pods are placed on a net conveyor and immersed in hot water for a period shorter than 1 minute. Subsequently, they are steam-cooked. The steam-cooking is performed at a temperature of 95° to 100° C. for 2 to 3 minutes and the material temperature is controlled at 85° to 90° C. When taken immediately at this point, the beans show an excellent taste with well-balanced saltiness and taste.

Further, the soybeans in pods are cooled to a material temperature of 30° to 35° C. by passing cooling water. Then they are smoothed on a vibrating conveyor and transported to the freezing unit. When taken as such immediately after the completion of the freezing, the frozen product has a saltiness. After thawing, they can be eaten as is, though they are somewhat hard. Next, the product is subjected to the third screening, weighed and packed in bags each containing 0.4 to 0.5 kg of the frozen soybeans in pods.

When thawed and then taken, these beans are excellent ones having a fresh taste, a saltiness and a soft texture. The salt content thereof is 1% while the hardness thereof determined with a tablet hardness tester was 0.5 kg in max., 0.3 kg in min. and 0.4 kg in average.

EXAMPLE 3

Soybeans in pods which are not infiltrated with brine of 15° in Baume for about 3 hours are subjected to the same method according to the Example 2. After being blanched, steam-cooked and cooled, these beans are excellent ones having a fresh taste.

Then, these soybeans in pods are infiltrated in brine in 20° in Baume for 1 minute. Then they are smoothed on a vibrating conveyer and transported to the freezing unit. Next, the products are packed in the same way as Example 2.

When thawed and eaten, these beans are excellent ones having a fresh taste, a saltiness and a soft texture. The salt content thereof is 0.8% while the hardness thereof determined with a tablet hardness tester is 0.4 kg in max., 0.3 kg in min. and 0.32 kg in average.

EXAMPLE 4

Soybeans in pods which are not infiltrated in brine of 15° in Baume for about 3 hours are subjected to the same method according to the Example 2. After being blanched, steam-cooked and cooled, these soybeans are excellent ones having a fresh taste and a soft texture. The hardness thereof determined with a tablet hardness tester is 0.6 kg in max., 0.4 kg in min. and 0.52 kg in average.

COMPARATIVE EXAMPLE

After harvesting and collecting, soybeans in pods are subjected to a first screening to eliminate unwanted products. After they are repeatedly washed with water and subjected to a second screening, they are blanched. This blanching consists of immersing the soybeans in pods in hot water for 90 seconds. Then these soybeans are cooled, freezed and packed in the same method as Example 2.

After thawed, these soybeans are excellent ones having a fresh taste. However, these soybeans have a little hard texture. The hardness thereof determined with a tablet hardness tester is 1.2 kg in max., 0.8 kg in min. and 0.9 kg in average.

The hardness of raw soybeans in pods determined with a tablet hardness tester is 2.8 kg in max., 1.8 kg in min. and 2.46 kg in average.

EXAMPLE 5

Raw soybeans in pods are heated at 100° C. for 5 minutes and cooled. Then they are packaged by several colors of cellophane and other materials, and kept under fluorescence at 5° C. for 48 hours. A color of the soybean is determined at a start and after 48 hours. The result is shown in Table 1.

The color is determined by a color and color-difference meter (Minolta type CR-200). What are measured in order to determine the color are L(brightness), a(+ numbers designate a degree of red, and − number designate a degree of green), b(+ numbers designate a degree of yellow, and − numbers designate a degree of blue) and [b/a]. In Table 1, a number following each [b/a], which is a variable ratio of b/a at a start and after 48 hours, shows larger as more yellow and smaller as more green.

TABLE 1

| kinds of cellophane | start | | | | | afer 48 hours | | | | |
|---|---|---|---|---|---|---|---|---|---|---|
| | L | a | b | [b/a] | ratio | L | a | b | [b/a] | ratio |
| PE[1] | 53.0 | −15.6 | 37.6 | 2.4 | 1.0 | 51.5 | −8.1 | 35.1 | 4.3 | 1.8 |
| transparent | 52.1 | −16.1 | 35.3 | 2.2 | 1.0 | 52.4 | −6.8 | 32.2 | 4.8 | 2.2 |
| green | 52.6 | −15.3 | 37.7 | 2.5 | 1.0 | 53.3 | −11.4 | 37.5 | 3.3 | 1.3 |
| blue | 51.1 | −16.4 | 35.1 | 2.1 | 1.0 | 50.0 | −12.7 | 34.1 | 2.7 | 1.3 |
| red | 52.4 | −16.5 | 37.8 | 2.3 | 1.0 | 52.5 | −11.4 | 36.8 | 3.2 | 1.4 |
| yellow | 52.1 | −16.4 | 38.2 | 2.3 | 1.0 | 53.9 | −9.3 | 38.5 | 4.2 | 1.8 |
| NP[2] | 54.5 | −16.1 | 38.1 | 2.4 | 1.0 | 55.3 | −6.3 | 33.4 | 5.3 | 2.2 |

[1])PE designates a transparent package material made from polyethlene.
[2])NP designates a transparent package material made from nylon.

EXAMPLE 6

Now the apparatus of the present invention will be described by reference to FIG. 1.

An apparatus for blanching a green agricultural product 101 has a double wall cylinder 102, a transporting portion 103, a driving motor 9, a chain wheel 8 and a bearing 11. The double wall cylinder including an outer cylinder 1 and an inner cylinder 2, which is located therein at an interval and has a number of pores 12 on its side wall, is inclined against the horizontal line.

A hopper 4 is provided in the upper part of the bottom of the outer cylinder 1, while a water valve 13 for controlling the amount of the pooled hot water is provided in the lower part of the bottom of the outer cylinder 1. Further, a feedstock outlet 7 is located in the lower part of the top of the outer cylinder 1.

Steam inlets 5 are formed in the lower part at the center of the double wall cylinder 102 to thereby supply steam into the cylinder. The amount of the steam to be supplied can be appropriately controlled. Furthermore, inlets 6 for supplying water into the cylinder are formed in the upper part at the center of the outer cylinder 1. These inlets 6 are directly connected to external water service pipes.

Since the outer cylinder 1 is substantially sealed, that is, the outer cylinder 1 is sealed except the hopper 4, the steam inlet 5, the water inlet 6, the feedstock outlet 7 and the water valve 13, the steam, which is blown off from the center of the cylinder, is condensed to thereby give hot water which is then pooled at the bottom of the inclined outer cylinder 1. The hot water is discharged from the water outlet 13, if necessary.

A transporting portion 103 comprising spiral transporting blades 3 and a shaft 10 is provided inside the inner cylinder 2. The spiral transporting blades 3, which swing around the inner wall of the inner cylinder, are attached to a shaft 10 located at the center line of the cylinder so as to form an integral structure. The shaft 10 is fixed to the cylinder via the bearing 11 at the end board 14 of the cylinder. Outside the outer cylinder 1, a chain wheel 8 or a pulley serving as a power transmission device for rotating the spiral transporting blades 3 are attached to the shaft 10. A driving motor 9 drives the spiral transporting blades 3, and the rotation speed of the driving motor 9 can be varied.

A green agricultural product is fed into the cylinder from the hopper 4 and immersed in the hot water pooled at the bottom of the double wall cylinder 102. During this period, the green agricultural product is subjected to a step of changing the color bright with the hot water so as to give a bright green color. Next, the green agricultural product is transported upward by the spiral transporting blades 3 rotating in the inner cylinder 2 and then exposed to steam blown off from the steam inlet 5. The inner cylinder and the spiral transporting blades may be in an arbitrary form so long as the green agricultural product on transportation can be efficiently contacted with the steam thereby. The green agricultural product is further transported in the inner cylinder 2 by the spiral transporting blades 3 and then taken out from the outlet 7.

According to the present invention, a green agricultural product can be processed into a product while maintaining its soft texture without deteriorating the freshness or deliciousness thereof. The processed product thus obtained can be frozen as such so as to maintain the softness, freshness and deliciousness. After thawing, it can be taken as such without heating.

The combined use of the hydrothermal treatment and the steam-cooking makes it possible to efficiently produce a green agricultural product to thereby give a product having a vivid green color and a good taste.

According to the apparatus of the present invention, the hydrothermal treatment and the steam-cooking can be performed in a single cylinder. Thus a green agricultural product can be efficiently blanched.

Further, the treating time of the hydrothermal treatment or the steam-cooking can be appropriately controlled by varying the rotation speed of the spiral transporting blades. By controlling the amount of the steam to be supplied, furthermore, the treating time and temperature for the hydrothermal treatment or the steam-cooking can be adjusted to the optimum level suitable for the treating conditions which vary depending on the type of the green agricultural product (for example, green pease in pods, soybeans in pods, kidney beans in pods, broad beans) and the degree of maturity and freshness of the beans.

Furthermore, a package according to the present invention can maintain the bright green color of agricultural products.

What is claimed is:

1. A frozen blanched green soybean in a pod wherein salt infiltrates through a skin to a center of the soybean before said soybean is frozen, such that immediately after thawing, said soybean has a soft texture and a salt content sufficient to provide a soybean product that is easily edible without further salt or cooking.

2. A frozen blanched soybean in a pod according to claim 1, said soybean being blanched before freezing in a blanching process comprising a first and a second step wherein the second step is performed at a higher temperature and for a greater duration then said first step.

3. A frozen blanched soybean according to claim 1, having a hardness of 0.3–0.6 Kg after thawing.

4. A frozen blanched soybean according to claim 2, having a hardness of 0.3–0.6 Kg after thawing.

5. A frozen blanched soybean according to claim 2, wherein said first step comprises immersing said soybean in hot water and said second step comprises steam-cooking said soybean.

6. A soybean according to claim 2, wherein said first step brightens said soybean and said second step swells said soybean.

7. A soybean according to claim 2, wherein said soybean has been infiltrated by brine.

8. A soybean according to claim 2, wherein said first step comprises steam-cooking said soybean.

9. A soybean according to claim 5, wherein said first step comprises immersing said soybean in hot water obtained by condensed steam at 90°–95° C. for a period of time shorter than one minute; and said second step comprises steam-cooking said soybean in a steam atmosphere at 95°–100° for two to three minutes.

10. A soybean according to claim 9, wherein said soybean has been infiltrated with brine.

11. A soybean according to claim 10, wherein said soybean has been infiltrated with brine for 2.5–3.5 hours before said blanching process.

12. A soybean according to claim 10, wherein said soybean has been infiltrated in brine for 0.5–1.5 minutes after said blanching process.

13. A soybean according to claim 1, wherein the salt content is 1%.

14. A soybean according to claim 1, wherein the salt content is 0.8%.

* * * * *